April 22, 1930.    J. F. O'CONNOR    1,755,409
CAR CONSTRUCTION
Filed July 27, 1928
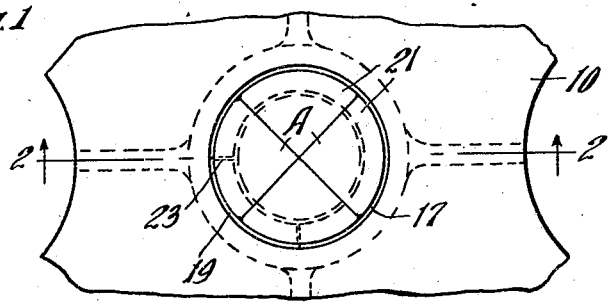
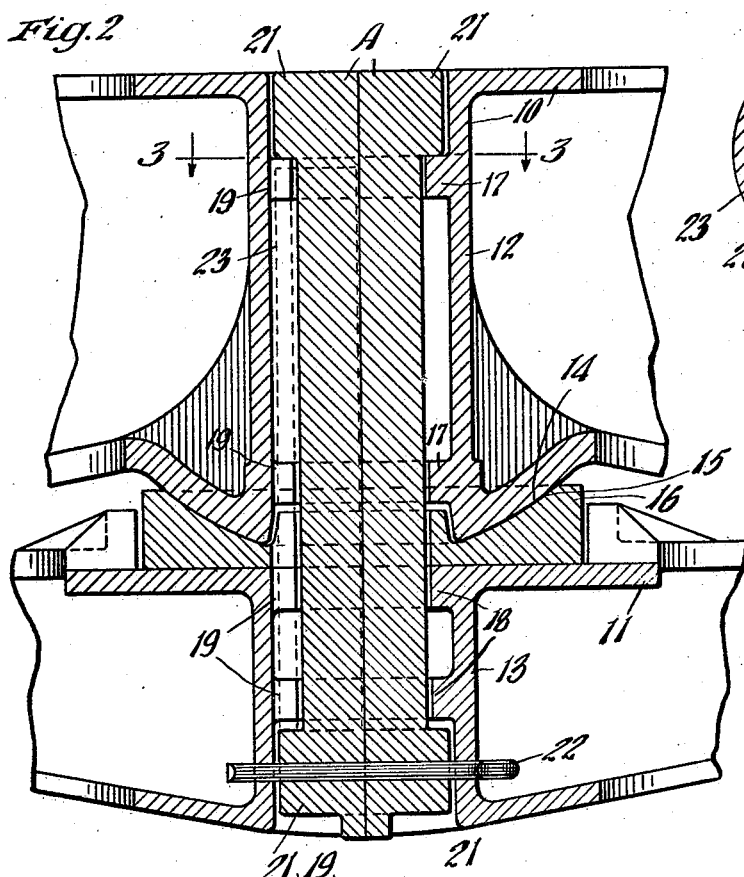
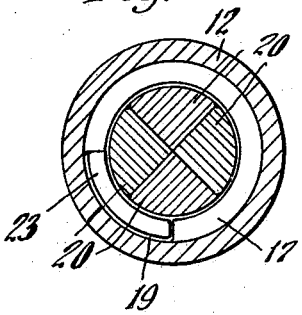
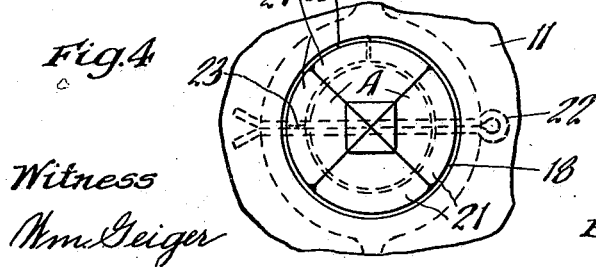
Inventor
John F. O'Connor
By Joseph Harris
His Atty.

Patented Apr. 22, 1930

1,755,409

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

CAR CONSTRUCTION

Application filed July 27, 1928. Serial No. 295,654.

This invention relates to improvements in car construction.

One object of the invention is to provide a simple and efficient locking center pin arrangement for body and truck bolsters of railway cars, wherein the pin is composed of a plurality of headed sections, the heads of each section having shouldered engagement with the respective bolsters to prevent removal of the pin, and the body and truck bolsters are provided with aligned pin receiving openings so formed that the headed sections of the pin may be assembled in succession with the bolsters and then turned to engaging relation with the shoulders of the bolsters, and wherein the pin is locked to one of said bolsters against relative rotation to prevent disengagement from said bolsters.

Another object of the invention is to provide a combined locking and center pin arrangement for body and truck bolsters of railway cars provided with aligned shouldered center pin receiving openings, wherein the center pin is composed of a plurality of headed sections and the shoulders of the bolster center pin openings are cut away to permit insertion of the headed sections, one at a time, said sections being assembled with the bolsters in succession and rotated to position the heads of the same in engagement with the shoulders of the bolsters to prevent removal of the pin sections, and wherein a filler member is also provided for said cut-away portions of the shoulders, said filler member being interposed between the heads at the opposite ends of said sectional pin and filling the space therebetween.

Other and further objects of the invention will more clearly appear from the description and claims hereinafter following.

In the drawing, forming a part of this specification, Figure 1 is a top plan view of the central portion of a body bolster of a passenger car, illustrating my improvements in connection therewith. Figure 2 is a vertical sectional view through the body and truck bolsters of said car, at the central portion thereof, corresponding substantially to the line 2—2 of Figure 1. Figure 3 is a horizontal, transverse sectional view, corresponding substantially to the line 3—3 of Figure 2. And Figure 4 is a bottom plan view of the central portion of the truck bolster shown in Figure 2.

In said drawing, 10 indicates generally the body bolster of the railway car and 11 the truck bolster thereof. The body bolster 10 is provided with a hollow, cylindrical, sleeve-like section 12, adapted to accommodate the locking center pin. The truck bolster 11 is also provided with a similar hollow, cylindrical, sleeve-like section 13, which receives the center pin. The body bolster is provided with the usual downwardly projecting spherical bearing member 14, which is seated within a bearing pocket 15 provided in a bearing block 16 supported on the top of the truck bolster. In carrying out my invention, I provide a sectional center pin A, headed at opposite ends, and so form the openings of the pin receiving sleeve sections of the body and truck bolsters as to permit assembling of the sections of the pin, one at a time, with the bolsters.

The body bolster 10 is provided with a horizontally disposed, interior rib 17 on the sleeve-like section 12 thereof, the rib 17 being cut away, as indicated at 19, for a purpose hereinafter described. Adjacent the bottom end of the sleeve 12 of the body bolster, a similar rib is provided which is also indicated by 17, the same being also cut away, as indicated at 19, and the cut-away portion thereof being in alignment with the cut-away portion of the rib at the top of the sleeve 12. The truck bolster is provided with an interior rib 18 on the sleeve 13 thereof, which is spaced from the bottom end of said sleeve, as clearly shown in Figure 2, and is cut away corresponding to the rib 17, the cut-away portion being also designated by 19, for a purpose hereinafter pointed out. At the top, the sleeve-like section is also provided with an interior rib similar to the rib 18, which is also designated by 18. The rib 18 has a section thereof correspondingly cut away to the bottom rib 18, said cut-away section being also designated by 19. The solid portions of the ribs 17—17 of the body bolster sleeve section 12 and the solid portions of the ribs 18—18 of the truck bolster sleeve 13 are of the same length, and the cut-away sections of the ribs are so located that the same will be in substantial alignment when the bolsters are disposed in parallel relation. The sections of the openings of the sleeves of the body and truck bolsters above the top rib 17 of the body bolster and below the bottom rib 18 of the truck bolster provide pockets adapted to accommodate the heads at the opposite ends of the sectional pin A.

The sectional pin A is preferably composed of four sections 20—20, which are of sector-shaped horizontal cross section. At each end, each section 20 is provided with a head portion 21. As shown, when the parts of the pin are assembled, the same form the complete cylindrical pin member having a shank of true cylindrical cross section and having enlarged heads at opposite ends thereof, which are also of true circular cross section. As shown, the head portions 21 of the sections 20 of the pin are of such a size that when the pin is assembled they completely fill the head receiving pockets of the bolsters. The cut-away portions of the ribs 17 and 18 are of such a size as to freely accommodate the head portion of each pin section 20, so that the sections may be inserted within the pin receiving openings of the bolsters in an endwise direction.

In assembling the sections of the pin A with the bolsters, it will be evident that the first section may be passed freely through the central portions of the openings of the bolsters and may then be moved to one side to engage the head sections 21 thereof, over the ribs 17 and 18 of the bolsters. The said section may also be placed in position by registering the head portions 21 thereof with the openings between the solid portions of the ribs 17 and 18 of the body and truck bolsters and then passing the section within the openings of the bolsters while guiding the head portions 21 through said cut-away sections of the ribs. The pin section is then rotated in position to overlap the head sections thereof with the ribs 17 and 18, and so as to clear the cut-away sections between the solid portions of said ribs.

The next section may then be inserted either through the top of the body bolster or through the bottom of the truck bolster, with the head sections thereof so positioned as to pass through the cut-away portions of the ribs 17 and 18. When this section has been brought into registration with the first section, the same is turned to one side so as to engage the head portions 21 thereof with the ribs 17 and 18 at the outer ends of the openings of the body and truck bolsters. The remaining two sections are inserted in a similar manner and after the last section has been inserted the entire pin is bodily rotated so as to bring both the section first assembled and the section last assembled in overlapping relation to the opening between the solid sections of the ribs of the bolsters. The pin is then locked in position to either of the bolsters by any well known means. In the present instance, the pin is shown as locked to the body bolster, a cotter pin 22 being preferably employed which extends through aligned openings in all of the sections of the pin and aligned openings in diametrically opposite portions of the side wall of the sleeve 13 of the body bolster. As will be evident, the sections of the pin are thus held against relative rotation with respect to the body bolster and cannot therefore become disengaged from said bolster. It is further pointed out that ordinarily in the operation of railway cars on curved track, the angular displacement of the bolsters with respect to each other will not be sufficient to disengage the two adjacent sections which overlap the openings between the solid portion of the ribs, from said ribs; but even in case this does occur, the cotter pin will prevent removal of the section of the pin A, which might otherwise be displaced.

In order to close the cut-away sections of the ribs, I provide a filler plate 23, which is shown in dotted lines in Figure 2 and illustrated in full lines in Figure 3. This filler plate is of curved cross section and fits between the outer walls of the openings in the sleeves 12 and 13 and the shank of the pin A. The filler plate is of such a width as to substantially fill the openings between the portions of the ribs 17 and 18, and is of such a height as to fill the space between the heads at the opposite ends of the combined locking and center pin A. When the filler plate is employed, the same is assembled with the bolsters and the locking pin A during the placing in position of the last section of the pin, the filler plate being first positioned between the head portions 21 at the opposite ends of said section of the pin and then inserted in the pin receiving openings of the bolsters with said section of the pin.

From the preceding description, taken in connection with the drawings, it will be evident that I have provided a sectional pin of exceptionally rugged design and great strength, which has relatively large shoulders in bearing engagement with the two bolsters of the car underframe structure to effectively anchor said bolsters to each other.

While I have herein shown and described what I consider the preferred manner of carrying out my invention, the same is merely illustrative and I contemplate all changes and modifications which come within the scope of the claims appended hereto.

I claim:

1. In car construction, the combination with body and truck bolsters having aligned center pin receiving openings, each of said bolsters being provided with a shouldered portion adjacent the outer end of the opening thereof; of a pin comprising a plurality of sections, each section having means at opposite ends thereof having shouldered engagement with the shoulders of said openings of the respective bolsters to prevent removal of the pin, said shoulders of the bolster being partly cut away to permit bodily insertion of the sections of said pin through the openings of said bolsters.

2. In car construction, the combination with body and truck bolsters of a car having aligned center pin openings, said bolsters having shoulders adjacent the outer end portions of said openings; of a pin composed of a plurality of sections, each section being headed at opposite ends, said sections being freely insertible through the pin receiving openings of the bolsters and being displaceable to engage the headed ends thereof with said shoulders of the bolsters to prevent separation of said bolsters, said pin, when completely assembled, fitting said openings.

3. In car construction, the combination with body and truck bolsters of a railway car having aligned center pin receiving openings; of a center pin for connecting said bolsters, said pin comprising a plurality of sections, each having head portions at opposite ends thereof, said sections, when assembled, forming a complete cylindrical pin having head members at opposite ends, which have shouldered engagement with said bolsters to prevent separation of the latter.

4. In car construction, the combination with body and truck bolsters each provided with a shouldered center pin receiving opening, said openings being in axial alignment; of a center pin comprising a plurality of sections disposed within said openings, each section having head portions at opposite ends thereof by which the pin is anchored to said bolsters; and means for locking said sections to one of said bolsters against rotation relative thereto.

5. In car construction, the combination with body and truck bolsters having aligned center pin receiving openings and center pin head receiving pockets; of a locking center pin for connecting said bolsters, said pin comprising a plurality of sections, each having a shank portion and head portions at opposite ends of the shank portion, said sections, when assembled, forming a complete cylindrical pin headed at opposite ends, the inner end walls of the head receiving pockets of said bolsters being cut away to permit insertion of said pin sections, one at a time, through said pin receiving openings, said sections being rotatable after insertion to engage said head sections thereof with the inner end walls of the pockets; and means for locking said sections against relative rotation with respect to one of said bolsters.

6. In car construction, the combination with body and truck bolsters having aligned center pin receiving openings, said openings having the walls thereof shouldered; of a sectional locking pin composed of a plurality of separate members of sector-shaped cross section, each of said members having head portions at opposite ends thereof, said sections, when assembled, forming a complete cylindrical pin having cylindrical heads at opposite ends thereof, said heads co-operating with the shoulders to prevent removal of the pin, said shoulders of the bolsters being cut away to permit insertion of said headed sections of the pin, one at a time, through said pin receiving openings, said sections being rotatable to overlap the heads thereof with said shoulders; and means for securing said sections against rotation with respect to one of said bolsters.

7. In car construction, the combination with body and truck bolsters having aligned center pin receiving openings, each of said bolsters being provided with a shouldered portion adjacent the outer end of the opening thereof; of a sectional pin having shouldered engagement at opposite ends with the shoulders of said openings to prevent removal of the pin, said shoulders being partly cut away to permit bodily insertion of the sections of said pin through the openings of said bolsters; and a filler for said cut-away portion of the shoulders of the bolsters, interposed between the shoulders at the opposite ends of the pin.

8. In car construction, the combination with body and truck bolsters having aligned center pin receiving openings, said openings having the walls thereof shouldered; of a sectional locking pin composed of a plurality of separate members of sector-shaped cross section, each of said members having head portions at opposite ends thereof, said sections, when assembled, forming a complete cylindrical pin having cylindrical heads at opposite ends thereof, said heads co-operating with the shoulders to prevent removal of the pin, said shoulders of the bolsters being cut away to permit insertion of said headed sections of the pin, one at a time, through said pin receiving openings, said sections being rotatable to overlap the heads thereof with said shoulders; and a filler member for said cut-away portions of the shoulders of the bolsters, said filler member fitting between the heads at the opposite ends of said sectional pin and occupying the space between the shank of the pin and the adjacent side wall sections of the pin receiving openings of the bolsters.

In witness that I claim the foregoing I have hereunto subscribed my name this 25th day of July, 1928.

JOHN F. O'CONNOR.